July 27, 1965  A. L. L. BRUNEL ETAL  3,197,176
HIGH SPEED AIR TURBINES
Filed Jan. 21, 1963  2 Sheets-Sheet 1
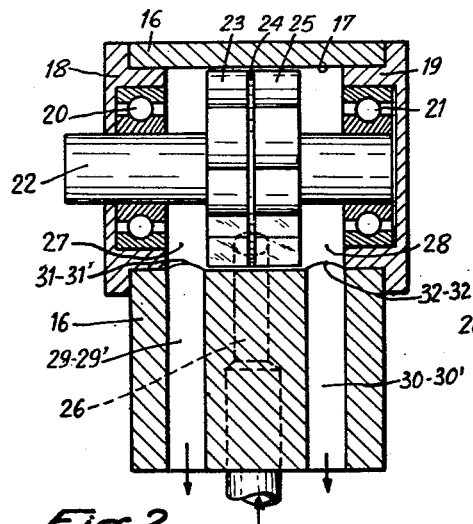
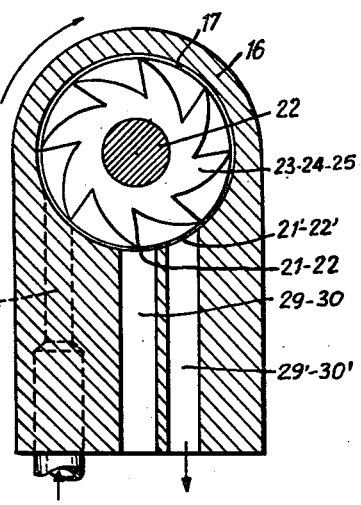
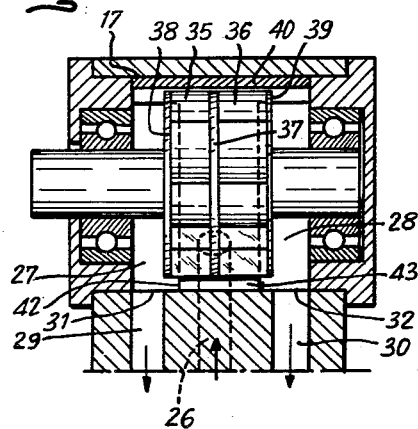
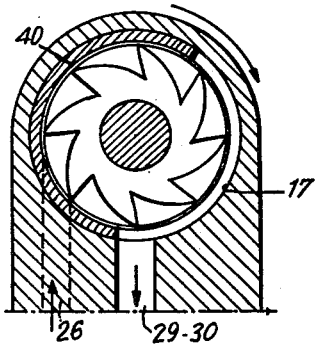
INVENTORS
ANDRE LUCIEN LAURENT BRUNEL
ROBERT MAURICE MERCIER
By Irwin S. Thompson
ATTY.

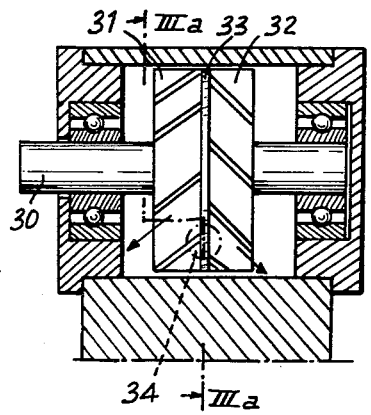
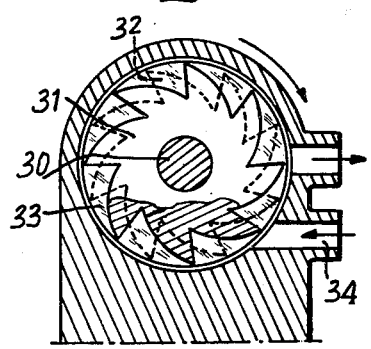
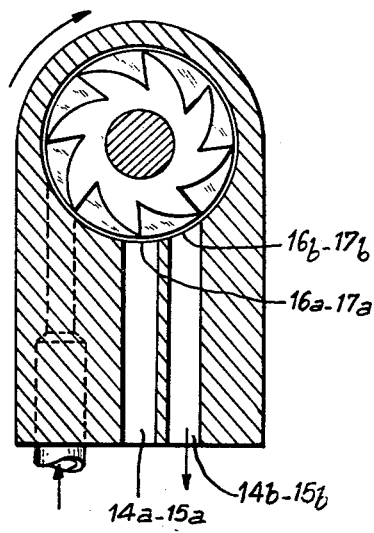
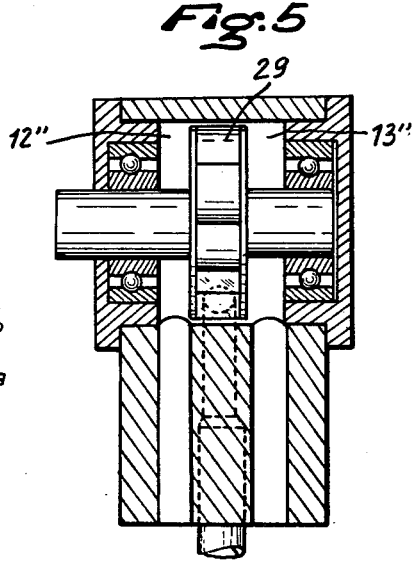

United States Patent Office 3,197,176
Patented July 27, 1965

3,197,176
HIGH SPEED AIR TURBINES
André Lucien Laurent Brunel, 182 Rue de Rivoli, and Robert Maurice Mercier, 172 Blvd. du Montparnasse, both of Paris, France
Filed Jan. 21, 1963, Ser. No. 252,691
Claims priority, application France, Jan. 29, 1962, 886,220, Patent 1,320,802
2 Claims. (Cl. 253—2)

The turbines resorting to compressed gases and more particularly compressed air, as a driving fluid, form very high speed enignes the bulk and weight of which are very small, their rotors having a diameter of a magnitude of 10 mm., so that they are particularly suitable for the execution of hand-controlled tools such as those used very frequently by dentists and highly accurate mechanics.

Generally speaking, the turbines resorted to for such uses, include, inside a smooth stator, a one-stage rotor subjected to the direct impulse of a jet of compressed air.

Such apparatuses often generate, during operation, noises at audible frequencies and at supersonic frequencies, the acoustic levels of which are extremely disturbing for the operator.

By way of example, we have already disclosed in our copending application Ser. No. 211,046 entitled "High Speed Silent Air Turbines" means for cutting out the supersonic vibrations generated by the injection of compressed air into said turbines of which the blades behave, as they pass in front of the injecting nozzles, as actual hooters producing supersonic waves.

Our experiments have shown that the noise produced by such turbines are of two different natures defined by very different ranges of frequencies:

—vibrations of a supersonic type, the frequency of which ranges between 40,000 and 50,000 cycles and corresponds exactly to the product of the number of revolutions by the number of blades, —audible vibrations of a magnitude ranging between 4,000 and 6,000 cycles generated by the beats between the vibrations produced respectively by the hooter effect of the injected compressed air and the hooter effect of the air expanding at the output end.

We have found, as a matter of fact, that the supersonic frequencies produced by said two hooter sources, have different wave lengths, and are consequently capable of producing beats.

We have endeavored to find means for quenching the parasitic production of waves of the hooter type appearing at the exhaust, so as to cut out thereby the production of beats generating objectionable vibrations.

Said result is obtained, according to our invention, by giving the air expanding at the output end of the rotor, a speed as low as possible and by designing the exhaust ports for said expanded air in a manner such that the passage of the blades near said ports, cannot generate any periodical and sudden cutting off of the stream of air passing out of the blades.

Our invention will be readily understood upon reading of the following description, reference being made to the accompanying drawing illustrating, by way of example and by no means in a limiting sense, various types of apparatus incorporating the above-disclosed ideas. In said drawings:

FIGS. 1 and 1a are respectively a longitudinal and a transverse vertical cross-section of a first embodiment of an improved turbine, FIGS. 2 and 2a illustrate, in a similar manner, a further embodiment, FIGS. 3 and 3a are respectively a longitudinal and a transverse cross-sectional view of a third embodiment wherein the turbine rotors are provided with helical blades, FIG. 4 illustrates a modification of the channel system shown in FIG. 2, FIG. 5 is a longitudinal cross-sectional view of a further embodiment wherein the turbine includes a single rotor.

Turning to FIG. 1, it is apparent that the stator is constituted by a metal member 1 in which is provided a smooth bore 2, adapted to carry the rotor. Said bore is closed at both ends by plugs 3 and 4 which serve for housing the corresponding ball bearings 5 and 6 between which revolves the shaft 7 on which the rotor blading 8 and 10 separated by a plate 9 is fitted with a force fit.

The driving energy of compressed air is transmitted to the rotor by a jet of air passing out of the nozzle 11 provided in the member 1, which jet impinges against the rotor, exactly in its central section. The air striking thus the blades and which is enclosed in the intervals between the successive blades, is exhausted laterally at either end of the rotor, into two chambers 12 and 13 which are defined by the inner cylindrical wall of the bore 2 and by the corresponding ball bearing and transverse surface of the rotor. The exhaust of the expanded air out of said two chambers is ensured by the channels 14 and 15 respectively opening into the corresponding chambers 12 and 13 through the ports 16 and 17. The channels 14 and 15 and the ports 16 and 17 are obviously shown superposed one behind the other in FIG. 1a. Obviously, the ports 16 and 17 lie entirely outside the path of the rotor blades so as to cut out the possibility of producing hooter vibrations.

In the modification illustrated in FIG. 2, the exhaust channels and ports are duplicated as shown at 14', 15', 16' and 17'.

In any event, in this and in all other embodiments of this invention, the exhaust channels and ports have a combined cross-sectional area that is substantially greater than the nozzles through which the air enters and from which the air impinges on the rotor blades.

It is thus apparent that in such a turbine, supersonic waves are produced by the cutting, by the blades, of the jet of air feeding the turbine whereas in contradistinction, the exhaust of the expanded air is subjected to no sudden and periodical cutting off, so that it does not lead to the production of any supersonic waves.

Thus, only one frequency of supersonic waves is produced so that the latter cannot generate any beats and therefore any audible vibrations.

FIGS. 2 and 2a are similar to FIGS. 1 and 1a and the parts thereof corresponding to part 2 and 11 to 17 are designated correspondingly by 2' and 11' to 17' respectively. In said FIGS. 2 and 2a, the rotor is constituted by two blade-carrying wheels 20 and 21, separated by a thin partition 22, and outwardly closed by two flanges 23 and 24, the whole system forming a block inside which the partition and flanges 22, 23 and 24 have a diameter equal to the outer diameter of the blades.

The rotor, thus constituted, revolves inside a stationary sleeve 25 housed inside the bore of the stator, the rotation of the rotor being ensured by the impetus of the jet of air passing out of the nozzle 11'. The output of the air which has expanded inside the rotor, is provided laterally, to either side of the rotor, in a very gradual manner, through the agency of a suitable cutting away of the periphery of the sleeve, which cutting away provides an arcuate passage for the air contained in the rotor, between the flanges 23 and 24, the periphery of the bore 2' and the edges 27, 28 of the opening formed in the sleeve.

The air passing out through said passage enters the chambers 12' and 13', out of which it is exhausted outwardly through the ports 16' and 17' into which the channels 14' and 15' open as precedingly.

This latter embodiment differs thus from that illustrated in FIG. 1 only through the use of a laterally closed rotor out of which the air escapes laterally through a narrow slot, constituted by the clearances provided over a section of the periphery of the stator, between the wall of the bore 2' and the outer edges of the flanges 23 and 24. The cross-section and the peripheral development of said slots are calculated so as to obtain a very gradual exhaust of the expanded air.

The requirements as to the position of the channels 14 and 15 are identical with those defined for the same channels in the case of FIG. 1.

A modified embodiment which is more economical and the bulk of which is smaller, while its efficiency is less than in the case of the embodiments disclosed hereinabove, is obtained by resorting no longer to a rotor provided with two bladings arranged symmetrically with reference to a medial partition, but to a rotor including a single blading with a lateral flange, and into which compressed air is injected laterally and tangentially with reference to said flange. The expanded air is exhausted laterally, as described hereinabove in lateral chambers 12" and 13" as shown in FIG. 5, which are entirely similar to the chambers 12 and 13 of FIG. 1 and extend to either side of the single rotor 29.

FIG. 3 shows the shape and structure of a turbine which is provided with a shaft 30 on which are fitted with a hard fit, two bladings 31 and 32, separated by a thin partition 33. The input air nozzle 34, similar to that illustrated at 11, 11' in FIGS. 1 and 2, terminates exactly in registry with the medial plane of the partition 33 which subdivides thus longitudinally the jet of air so as to feed equally the two operative halves of the rotor.

The bladings are cut along helical lines so as to further the yield and chiefly so that the expanded air passes laterally out of the rotor with a speed as reduced as possible.

In order to quench the supersonic vibrations produced by the interaction between the streams of compressed air passing out of the rotor bladings, the bladings of the two wheels 31 and 32 are shifted by one half pitch with reference to each other.

What we claim is:

1. A substantially silent high speed turbine comprising a stator having a smooth axially extending cylindrical bore of uniform diameter and including removable terminal walls closing transversely the opposite ends of said axially extending cylindrical bore, a shaft coaxially revolvably carried in the cylindrical bore of the stator, a rotor having peripherally offset blades on opposite axial ends of the rotor and rigid with said shaft, the opposite ends of said rotor terminating a distance axially spaced from said terminal walls of said cylindrical bore to define an empty annular end chamber between each end of the rotor and the adjacent terminal wall, aperture means in the peripheral wall of said cylindrical bore for introducing a jet of compressed fluid into the cylindrical bore in a plane perpendicular to the axis of said bore into the rotor blades and into each of said end chambers, and means only in the peripheral walls of said cylindrical bore and chambers communicating with each of said end chambers and having a cross-sectional area substantially greater than the cross-sectional area of said aperture means whereby fluid received in said end chambers from said blades is discharged without howl.

2. A turbine as claimed in claim 1, in which said blades are helically arranged in herringbone formation.

References Cited by the Examiner

UNITED STATES PATENTS

| 803,595 | 11/05 | Hofmann | 253—116 |
| 845,334 | 2/07 | Cooper | 253—44 |
| 1,110,423 | 9/14 | Crommett | 253—111 |
| 2,382,526 | 8/45 | White | 253—2 |

JOSEPH H. BRANSON, JR., *Primary Examiner.*